Dec. 9, 1947.  R. C. DEHMEL  2,432,140
VARIABLE POTENTIAL INTEGRATING DEVICE
Filed July 13, 1944

INVENTOR.
RICHARD C. DEHMEL
BY
his attorneys.

Patented Dec. 9, 1947

2,432,140

UNITED STATES PATENT OFFICE 2,432,140

VARIABLE POTENTIAL INTEGRATING DEVICE

Richard C. Dehmel, Summit, N. J.

Application July 13, 1944, Serial No. 544,714

6 Claims. (Cl. 172—240)

This invention relates to electrical devices responsive to a variable input voltage and particularly to the control and operation of movable members by and in accordance with a variable electric potential such, for example, as is the case in various electric computing machines, registering devices, and the like.

An object of this invention is to provide a device capable of moving a registering or computing member at a velocity proportional to the instant value of a voltage which may vary not only in magnitude but in a positive and negative sense.

A further object is to provide an electrical computing machine or the like constructed and arranged to operate a movable registering or computing member in a manner which is directly proportional to the variable input voltage, so that the variations in the operating voltage over a determinate time interval will be mechanically integrated by the registering or computing member whereby the position thereof at any given instant is the result of the integration of the different potentials during such time interval.

Figure 1:
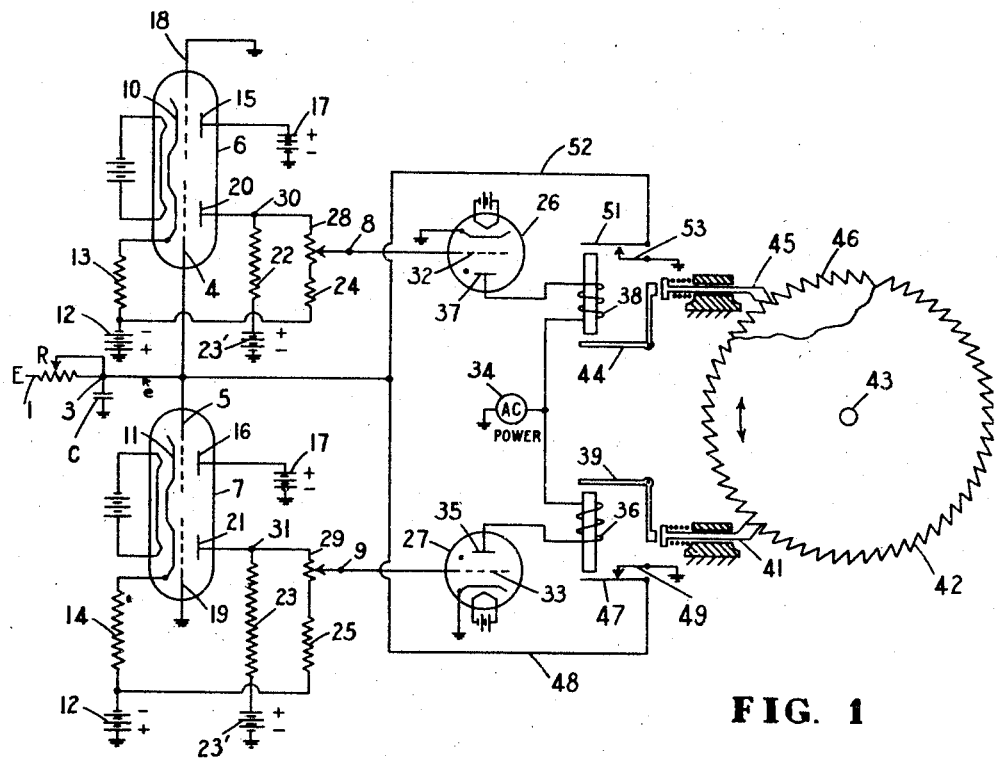
Figure 2:
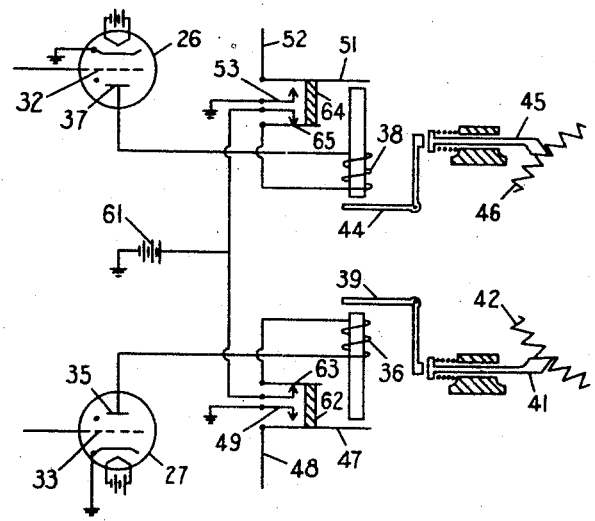

These and other objects which will be apparent are accomplished by the invention hereinafter described and illustrated in the accompanying drawing in which Fig. 1 is a diagrammatic view showing an arrangement of circuit connections comprising one embodiment of the present invention, and Fig. 2 shows a modification.

Generally speaking, in the present embodiment, a registering element is actuated by a rotatable shaft which is moved in one direction in response to a positive input potential and in the other direction in response to a negative potential, the velocity or rate of movement of the shaft in either direction being directly proportional to the input voltage. A pair of thermionic tubes are so arranged as to amplify the input voltage and transmit it to the control grids of a pair of gas-discharge tubes such as a pair of thyratron tubes which are connected to the respective thermionic tubes in such a way that one gas-discharge tube is actuated by a positive input voltage, while the other is actuated by a negative voltage. The discharge of one tube is employed to operate a mechanical device for moving the indicating member, such as the rotatable shaft referred to, in one direction, while the discharge of the other tube operates a mechanism for rotating the shaft in the other direction. The rate of rotation imparted to the shaft is proportional to the input voltage and the direction of rotation determined by whether the potential is positive or negative.

As illustrated, a control voltage E is impressed on the circuit through a conductor 1 connected to a condenser C through an impedance such as a resistance R, the values of the condenser and the resistance being so chosen that the condenser is charged at a predetermined desired rate to produce a certain potential e at the junction 3 where the condenser C and conductor 1 are connected.

The junction 3 is connected to the grids 4 and 5, respectively, of two thermionic tubes 6 and 7 to amplify the input voltage changes and transmit such amplified changes to junctions 8 and 9, respectively. Consequently, the voltage changes at the junctions 8 and 9 are amplifications of the voltage variations across the condenser C and the connections to the thermionic tubes 6 and 7 are such that the potential at the junction 8 is opposite to the potential at the junction 9. For this purpose, as well as to provide circuit stability, the thermionic valves 6 and 7 are preferably twin triode tubes having cathodes 10 and 11, respectively, each formed by a single cathode element, or, as illustrated, by interconnected separate elements. The cathode of each tube is preferably connected to a low impedance source 12 of constant negative potential through high ohmic resistances 13 and 14, respectively. The anodes 15 and 16 of the thermionic valves are energized by a preferably low impedance source 17 of constant positive potential. The respective grids 18 and 19 are grounded, while the remaining anodes 20 and 21, respectively, are energized through plate impedances 22 and 23, respectively, by a preferably low impedance source 23' of constant positive potential. Additional impedances 24 and 25, respectively, which are energized by the constant negative potential source 12 are provided for the purpose of bringing the mean potential of the junctions 8 and 9 to approximately ground potential for a purpose hereinafter described. Obviously, the tubes have conventional filaments connected to any suitable source of potential.

The amplified voltage variations of the junctions 8 and 9 are employed for operating a movable indicating member such, for example, as a rotatable shaft through separate mechanisms which are separately actuated when a positive potential is established at either junction. For this purpose, a pair of thyratron tubes 26 and 27 are associated with the junctions 8 and 9, respectively. The mean potential of the junctions 8 and 9 is controlled through a vernier control provided by potentiometers 28 and 29 and it will be apparent, as hereinafter described, that the circuit connections vary the potentials of the junctions 8 and 9 in an amount proportional to changes in the potential $e$ at junction 3, in the following manner.

A potential $e$ on grid 4 of thermionic tube 6 varies the space current to the anode 20 in the well known manner. If the potential $e$ increases positively, the anode current to the plate 20 rises. This causes an increased voltage drop across the impedance 22 which may be a resistance. Accordingly, the potential at the junction 30 connecting the impedance to the plate becomes negative with respect to its mean value. On the other hand, the accompanying positive increase in the potential on the grid 5 of the thermionic tube 7 produces a rise of the potential at the junction 9 in the following manner. A positive increase in the potential on the grid 5 increases the space current from the source 12 through the cathode resistor 14 and from the cathode 11 to the anode 16, this current flow being aided by the source 17 of potential. The resulting increased cathode current produces an increase in the voltage drop across the cathode resistor 14 and, hence, increases the potential of the cathode 11 with respect to ground and therefore with respect to the grid 19. This is the equivalent of the grid 19 becoming more negative with respect to the cathode 11 and thus reducing the space current to the anode 21 which in turn flows through the impedance 23, which also may be a resistance similar to the resistance 22. This decreased current results in a lower voltage drop across the impedance 23 and, hence, a rise in potential at the junction 31 between the impedance and the anode 21. Consequently, the junction 9 rises above its mean value of potential.

The junctions 8 and 9 are respectively connected to the grids 32 and 33 of the thyratron or other gas-discharge valves 26 and 27. A source 34 of alternating current is connected to the anode 35 of the tube 27 through a winding 36 and to the anode 37 of the tube 26 through a winding 38. The winding 36 is adapted to actuate a bell crank lever 39 having one arm in position to operate a spring pressed pawl 41 cooperating with a ratchet 42 for rotating the shaft 43 in one direction. Similarly, the winding 38 actuates a bell crank lever 44 having an arm arranged to operate a spring pressed pawl 45 to rotate a ratchet 46 for rotating the shaft 43 in the opposite direction. A movable armature 47 connected over a lead 48 to the junction 3 and condenser C is arranged to close a ground connection 49 to discharge the condenser and thereby restore the circuit to its initial condition in readiness to repeat the cycle of operations as hereinafter described. Similarly, an armature 51 connected over a lead 52 with the junction 3 and condenser C is adapted to be actuated by the winding 38 to close a grounded contact 53 and discharge the condenser C upon actuation of the pawl and ratchet 45 and 46.

Alternatively, a source 61 of direct current can be connected to the anodes 35 and 37 through the windings 36 and 38, respectively, when it is desired to employ direct current in place of alternating. An insulating plunger 62 is arranged to be actuated by movement of the armature 47 to open switch contacts 63 in the connection between the relay 36 and the current source 61 to de-energize the relay 36 at the same time that the grounded contact 49 is closed. A similar insulating bushing 64 is adapted to be moved by the armature 51 to open the contacts 65 in the connection between the relay 36 and the source of direct current to de-energize the relay simultaneously with closing of the grounded contact 53. This arrangement permits the use of a direct current to supply the tube 26 and 27 and insures breaking of the relay circuits from the direct current source at the same time that the condenser 31 is discharged. Other arrangements will readily suggest themselves.

As is well known, a grid-controlled gas-discharge rectifier passes no anode current until the potential of the grid has been increased in a positive direction above a critical negative value. Accordingly, if the grids 32 and 33 of the thyratron or similar valves are maintained at a mean negative value by adjustment of the respective potentiometers 28 and 29, the thyratron valves 26 and 27 will not discharge until the potential $e$ at the junction 3 has driven the potential at either of the junctions 8 or 9 above the said critical potential of the grids 32 or 33. If the potential E is positive, the potential $e$ at the junction 3 will be positive and, therefore, the junction 9 and the grid 33 of the tube 27 will be driven to a positive potential in the manner above described, and the tube 27 will operate causing current from the alternating potential source 34 to discharge unidirectionally through the relay winding 36 causing the bell crank 39 to actuate the spring pressed pawl 41 and rotate the ratchet 42 and shaft 43 in a counterclockwise direction. The pawl spring returns the pawl and bell crank to their original positions. Energizing of the relay winding 36 also moves the armature 47 to close the grounded contact 49 and discharge the condenser C over the lead 48 thereby restoring the circuit to its initial condition in readiness to repeat the above described cycle. By employing an alternating current source 34, the discharge of the condenser C by operation of the armature 47, and the restoration of the grid 33 to its mean potential, causes stoppage of current flow through the valve 27 on the first reversal of current from the alternating current source.

A negative potential at E, on the other hand, drives the grid 32 of the valve 26 to a positive value permitting current from the source 34 to flow through the relay winding 38 to actuate the bell crank 44 and operate the spring pressed pawl 45 to rotate the associated ratchet 46 and shaft 43 in a clockwise direction. The winding 38 also operates armature 51 to close the grounded contact 53 thereby discharging the condenser C over the lead 48. This restores the potential of the grid 32 to its mean value and renders the valve 26 inoperative after the first reversal of current from the alternating current source 34, and the circuit is again in condition for repetition of either cycle.

Inasmuch as the time required for the condenser C to reach a voltage which will cause grids 32 or 33 to deviate sufficiently from their mean potential to operate the respective valves 26 and 27 is directly and substantially linearly proportional to the input voltage E, the shaft 43, or other movable member, will rotate in a direction and at a speed directly proportional to the value of the input voltage, except for small potentials which can be disregarded. Also, it should be noted that the rate of voltage increase on the condenser C is dependent on the value of the resistance R. By making this an adjustable resistance, as illustrated, the proportionality factor between the rate of rotation of the shaft 43 and the input voltage E may be varied at will. Furthermore, an additional control of the proportionality factor is obtained by the adjustable potentiometers 28 and 29 which determine the mean potential of the connected grids 32 and 33 and thereby determine the rise of potential at junction 3 which is necessary to drive the grids to their operating potential.

It is well known that a serious deficiency in direct current amplifiers has been a drift in their mean output potential. This results from various causes such as temperature changes in the cathode, variations in its emissivity, gas in the envelope of the valve, and some other well known factors. The thermionic valve circuits herein shown mitigate this difficulty. For example, a change in cathode emissivity produces a change in space current to the anode of the respective valve connected to the source 17. This correspondingly affects the voltage across the associated cathode resistor and, hence, the relationship of the cathode potential to that of the valve grids. This change in relative grid potentials causes an opposing change in current to the anode connected to the source 23'. This stabilizes the anode current and also the mean output potential of the valve.

Although I have described and shown in detail one specific embodiment of this invention, it will be apparent that the invention can be variously modified and adapted within the scope of the appended claims.

I claim:

1. The combination in a device responsive to a variable input voltage, of a condenser arranged to be charged by said input voltage at a rate according to a predetermined time constant, a movable member and means for controlling said member whereby its position at any given instant is a result of the time integral of the varying potentials, including separate means controlled by the input voltage for moving said member in opposite directions, an amplifier circuit responsive to a negative input potential for controlling one of said means to move said member in one direction and responsive to a positive input potential for controlling the other of said means to move said member in the opposite direction, and means operable upon limited actuation of said member in either direction for discharging said condenser and starting anew the operating cycle.

2. The combination with an electrical circuit on which is impressed a varying potential and including a condenser arranged to be charged thereby at a rate according to a predetermined time constant, of a movable member, means for controlling said member whereby its position at any given instant is a result of the time integral of the varying potentials, including separate thermionic valve means, an amplifier circuit arranged to operate one of said valve means in response to a negative input potential and to operate the other of said valve means in response to a positive input potential, a relay having a coil electrically connected on one side to the anode of said first valve means and on the other side to an alternating current source, mechanism operated by said relay for moving said member in one direction, a second relay having a coil electrically connected on one side to the anode of said other valve means and on the other side to said alternating current source, mechanism operated by said second relay for moving said member in the opposite direction, and means actuated by said relays for discharging said condenser and restoring the grids of said valve means to mean potential and releasing said relays.

3. The combination with an electrical circuit on which is impressed a varying potential and including a condenser arranged to be charged thereby at a rate according to a predetermined time constant, of a movable member, means for controlling said member whereby its position at any given instant is a result of the time integral of the varying potentials, including separate thermionic valve means, an amplifier circuit arranged to operate one of said valve means in response to a negative input potential and to operate the other of said valve means in response to a positive input potential, a relay having a coil electrically connected on one side to the anode of said first valve means and on the other side to an alternating current source, mechanism operated by said relay for moving said member step by step in one direction, a second relay having a coil electrically connected on one side to the anode of said other valve means and on the other side to said alternating current source, mechanism operated by said second relay for moving said member step by step in the opposite direction, and means actuated by said relays for discharging said condenser and restoring the grids of said valve means to mean potential and releasing said relays.

4. The combination with an electrical circuit on which is impressed a varying potential and including a condenser arranged to be charged thereby at a rate according to a predetermined time constant, of a movable member, means for controlling said member whereby its position at any given instant is a result of the time integral of the varying potentials, including separate thermionic valve means, an amplifier circuit arranged to operate one of said valve means in response to a negative input potential and to operate the other of said valve means in response to a positive input potential, a relay having a coil electrically connected on one side to the anode of said first valve means and on the other side to a current source, mechanism operated by said relay for moving said member in one direction, a second relay having a coil electrically connected on one side to the anode of said other valve means and on the other side to a current source, mechanism operated by said second relay for moving said member in the opposite direction, and means actuated by said relays for discharging said condenser, restoring the grids of said valve means to mean potential and releasing said relays.

5. The combination with a movable member, of means for moving said member, an electric circuit, a stable direct current amplifier for increasing the level of the potential of such circuit and a thermionic valve responsive to said amplified potential for controlling the operation of said means.

6. The combination with an electrical circuit on which is impressed a varying potential and including a condenser arranged to be charged thereby at a rate according to a predetermined time constant, of a movable member, means for controlling said member whereby its instant position represents the time integral of the varying potentials, said means including thermionic control means responsive to a positive input potential for moving said member by steps in one direction at a rate proportional to said positive potential and thermionic control means responsive to a negative input potential for moving said member by steps in the opposite direction at a rate proportional to said negative potential and means operable according to each step operation for discharging said condenser and starting anew the operating cycle.

RICHARD C. DEHMEL.

REFERENCES CITED

The following references are of record in the file of this patent:

UNITED STATES PATENTS

| Number | Name | Date |
|---|---|---|
| 2,163,411 | Seeley | June 20, 1939 |
| 2,368,582 | Sziklai | Jan. 30, 1945 |
| 2,185,767 | Jefferies | Jan. 2, 1940 |
| 2,329,400 | Leone | Sept. 14, 1943 |
| 2,365,937 | Christmann | Dec. 26, 1944 |
| 2,232,212 | Cary | Feb. 18, 1941 |
| 2,273,987 | Pineo | Feb. 24, 1942 |